(12) United States Patent
Lakshminarayan et al.

(10) Patent No.: US 12,526,103 B2
(45) Date of Patent: Jan. 13, 2026

(54) SUPERFRAME EXTENSION MODE

(71) Applicant: RESIDEO LLC, Golden Valley, MN (US)

(72) Inventors: Nagaraj Chickmagalur Lakshminarayan, Karnataka (IN); Anand Kavatekar Narayan Rao, Karnataka (IN); Sheetal R. Kadam, Karnataka (IN); Sachin Joy, Karnataka (IN)

(73) Assignee: RESIDEO LLC, Golden Valley, MN (US)

( * ) Notice: Subject to any disclaimer, the term of this patent is extended or adjusted under 35 U.S.C. 154(b) by 436 days.

(21) Appl. No.: 18/175,758

(22) Filed: Feb. 28, 2023

(65) Prior Publication Data
US 2024/0106592 A1  Mar. 28, 2024

(30) Foreign Application Priority Data
Sep. 22, 2022 (IN) .............................. 202241054404

(51) Int. Cl.
*H04W 48/10* (2009.01)
*H04L 5/00* (2006.01)
(Continued)

(52) U.S. Cl.
CPC ........... *H04L 5/0048* (2013.01); *H04W 48/10* (2013.01); *H04W 72/0446* (2013.01); *H04W 72/0453* (2013.01)

(58) Field of Classification Search
CPC ................................ H04L 12/28; H04L 12/50
(Continued)

(56) References Cited

U.S. PATENT DOCUMENTS 6,031,827 A    2/2000   Rikkinen et al.
6,470,006 B1  10/2002   Moulsley
(Continued)

FOREIGN PATENT DOCUMENTS

CN   103596191 B   12/2016
EP     2757837 A1   7/2014
(Continued)

OTHER PUBLICATIONS

International Search Report and Written Opinion of the International Application No. PCT/US2023/014056, mailed Jun. 19, 2023, 16 pg.
(Continued)

*Primary Examiner* — Dang T Ton
(74) *Attorney, Agent, or Firm* — Greenberg Traurig, LLP; Nicholas Martin; David J. Dykeman

(57) ABSTRACT

A method includes entering a communication extension mode. After entering the communication extension mode, the method includes outputting via a network, to at least a first device of a first partition and a second device of a second different partition, a first beacon signal of a first communication extension mode frame. The first beacon signal can include a first indication of one slot of the first communication extension mode frame to be output after the first beacon signal and corresponding to a first communication protocol and a second indication of another slot of the first communication extension mode frame to be output after the first beacon signal and corresponding to a second different communication protocol. After outputting the first beacon signal, the method includes using the one slot of the first communication extension mode frame, corresponding to the first communication protocol, to transmit data from the first device of the first partition. And, after outputting the first beacon signal, the method includes using the another
(Continued)

slot of the first communication extension mode frame, corresponding to the second communication protocol, to transmit data via the network from the second device of the second partition.

20 Claims, 6 Drawing Sheets

(51) Int. Cl.
 *H04W 72/0446* (2023.01)
 *H04W 72/0453* (2023.01)
(58) Field of Classification Search
 USPC .................................. 370/329.401, 403, 395
 See application file for complete search history.

(56) References Cited

U.S. PATENT DOCUMENTS

| | | |
|---|---|---|
| 6,690,657 B1 | 2/2004 | Lau et al. |
| 7,593,422 B2 | 9/2009 | Shvodian |
| 8,228,859 B2 | 7/2012 | Wang et al. |
| 8,467,357 B2 | 6/2013 | Wang et al. |
| 8,884,774 B2 | 11/2014 | Sanderford, Jr. |
| 9,285,988 B2 | 3/2016 | Kenney et al. |
| 9,312,976 B2 | 4/2016 | Zhang |
| 9,565,657 B2 | 2/2017 | Suresh et al. |
| 9,736,703 B2 | 8/2017 | Goldsmith et al. |
| 9,814,038 B2 | 11/2017 | Suresh et al. |
| 9,872,146 B2 | 1/2018 | Mycek et al. |
| 9,913,232 B2 | 3/2018 | Seo et al. |
| 9,930,641 B2 | 3/2018 | Beema et al. |
| 9,978,237 B2 | 5/2018 | Britt et al. |
| 10,039,052 B2 | 7/2018 | Zhou et al. |
| 10,051,494 B2 | 8/2018 | Rengarajan et al. |
| 10,091,786 B2 | 10/2018 | Schmidl et al. |
| 10,129,916 B1 | 11/2018 | Lakshminarayan |
| 10,237,237 B2 | 3/2019 | Dawes et al. |
| 10,499,405 B2 | 12/2019 | Lee et al. |
| 10,798,539 B2 | 10/2020 | Marschalkowski et al. |
| 10,833,754 B2 | 11/2020 | Desclos et al. |
| 10,913,094 B2 | 2/2021 | Li et al. |
| 11,184,322 B2 | 11/2021 | Dawes et al. |
| 11,329,842 B2 | 5/2022 | Lakshminarayan et al. |
| 11,425,199 B2 | 8/2022 | Eskildsen et al. |
| 2003/0137993 A1 | 7/2003 | Odman |
| 2005/0058149 A1 | 3/2005 | Howe |
| 2006/0068820 A1 | 3/2006 | Sugaya et al. |
| 2007/0090996 A1 | 4/2007 | Wang |
| 2008/0032738 A1 | 2/2008 | Lemke et al. |
| 2008/0255636 A1 | 10/2008 | Delmain et al. |
| 2009/0103488 A1 | 4/2009 | Zhu et al. |
| 2011/0038356 A1 | 2/2011 | Bachrach |
| 2012/0044827 A1 | 2/2012 | In et al. |
| 2012/0166338 A1 | 6/2012 | Agnelli et al. |
| 2013/0320080 A1 | 12/2013 | Olson et al. |
| 2014/0098761 A1* | 4/2014 | Lee .................. H04L 5/0053 370/329 |
| 2014/0324410 A1 | 10/2014 | Mathews et al. |
| 2014/0375428 A1 | 12/2014 | Park |
| 2015/0108901 A1 | 4/2015 | Greene et al. |
| 2015/0356332 A1 | 12/2015 | Turner et al. |
| 2016/0029346 A1 | 1/2016 | Suresh et al. |
| 2016/0044661 A1 | 2/2016 | Suresh |
| 2017/0055199 A1 | 2/2017 | Petersen et al. |
| 2017/0223615 A1 | 8/2017 | Lee et al. |
| 2017/0230810 A1 | 8/2017 | Banerjea |
| 2017/0273013 A1 | 9/2017 | Edara et al. |
| 2017/0332049 A1 | 11/2017 | Zhang |
| 2017/0359790 A1 | 12/2017 | Wang et al. |
| 2018/0041959 A1 | 2/2018 | Yang et al. |
| 2018/0098263 A1 | 4/2018 | Luo et al. |
| 2018/0242100 A1 | 8/2018 | Gandhi et al. |
| 2018/0242312 A1 | 8/2018 | Gandhi et al. |
| 2018/0279208 A1 | 9/2018 | Eskildsen et al. |
| 2018/0324607 A1 | 11/2018 | Rengarajan et al. |
| 2019/0132836 A1 | 5/2019 | Li et al. |
| 2019/0197838 A1 | 6/2019 | Beema et al. |
| 2019/0199578 A1 | 6/2019 | Lakshminarayan et al. |
| 2019/0250899 A1 | 8/2019 | Riedl et al. |
| 2019/0281371 A1 | 9/2019 | Klicpera |
| 2019/0281608 A1 | 9/2019 | Huang et al. |
| 2019/0380018 A1 | 12/2019 | Tian |
| 2020/0037252 A1 | 1/2020 | Chiarizio et al. |
| 2020/0068578 A1 | 2/2020 | Lee et al. |
| 2020/0267561 A1 | 8/2020 | Lakshminarayan et al. |
| 2020/0267738 A1 | 8/2020 | Barbu et al. |
| 2020/0296664 A1 | 9/2020 | Lakshminarayan et al. |
| 2021/0201486 A1 | 7/2021 | Takenouchi |
| 2021/0250197 A1 | 8/2021 | Lakshminarayan et al. |

FOREIGN PATENT DOCUMENTS

| | | |
|---|---|---|
| EP | 3506719 A1 | 7/2019 |
| EP | 3951732 A1 | 2/2022 |
| JP | 2000341751 A | 12/2000 |
| WO | 9819400 A1 | 5/1998 |
| WO | 2016160215 A1 | 10/2016 |
| WO | 2017143320 A1 | 8/2017 |
| WO | 2020096969 A1 | 5/2020 |
| WO | 2020195379 A1 | 10/2020 |

OTHER PUBLICATIONS

Mohamad Jaafer Ali, et al., "Efficient Access Arbitration Among Interfering WBANs Using Latin Rectangles", ARXIV.org, Cornell University Library, Jan. 27, 2017, XPO80752029, 12 pgs.
IEEE 802.11, Wikipedia, The free Encyclopedia, last edit Dec. 30, 2019, accessed on Feb. 4, 2019, 15 pgs.

* cited by examiner

SUPERFRAME EXTENSION MODE

RELATED APPLICATIONS

This application claims priority to India Provisional Patent Application No. 202241054404, filed in India on Sep. 22, 2022, the entire contents of which are incorporated herein by reference.

TECHNICAL FIELD

This disclosure relates to networks, particularly networks used in, for example, home monitoring systems, comfort systems, and security systems.

BACKGROUND

A home network may use a wireless network protocol to connect devices within the home. For example, a hub device may use IEEE 802.15.4 to connect to over one hundred sensor devices in a home to the hub device. The hub device may then collect sensor data collected by the sensor devices in the home. For instance, the hub device may collect temperature readings from multiple temperature sensors arranged within the house and output the temperature readings to a thermostat that controls an HVAC system using the temperature readings. In another instance, the hub device may collect door/window sensor readings and output the door/window sensor readings to a home security sensor.

SUMMARY

In general, this disclosure relates to systems, devices, and techniques for wirelessly connecting devices using multiple wireless protocols that use time-division duplexing, such as, for example, time-division multiple access (TDMA). As used herein, time-division duplexing may refer to processes that allocates each communication of multiple communications at a particular frequency (e.g., a 2.4 GHz band) into a time "slot" of a repeating "superframe." In contrast, frequency-division multiplexing may assign each communication of multiple communications to a unique frequency.

In many applications of such wireless communication, a single premises can include multiple zones or partitions, with each such partition defining a grouping of one or more devices (e.g., sensor devices) that communicate with a hub (e.g., control panel). In order to facilitate wireless communication between the hub and the devices of the various partitions, the present disclosure describes a communication extension mode. For example, in a communication default mode the hub can output a frame, such as a superframe, to allow the hub device to wirelessly communicate with a predetermined number of partitions at the premises, such as four partitions. However, when a premises at which the hub and devices are to be applied includes more than the predetermined number of partitions at the premises (e.g., more than four partitions at the premises), the hub can be configured to enter a communication extension mode (e.g., transition from the communication default mode to the communication extension mode). When in the communication extension mode, the hub can be capable of wirelessly communicating with an increased number of partitions at the premises as compared to when the hub device is in the communication default mode. As one example, when the hub device is in the communication default mode the hub device can be capable of communicating with up to four partitions at the premises, but when the hub device is in the communication extension mode the hub device can be capable of communicating with more than four partitions at the premises (e.g., capable of communicating with up to sixteen partitions at the premises).

The communication extension mode can be configured to facilitate communication with an increased number of partitions at the premises by, for instance, utilizing the extent of the beacon slot payload of the frame output in the communication extension mode and then allocating an expanded number of partitions to a slot in the frame subsequent to the beacon slot to thereby provide additional payload capacity to the frame for accommodating such expanded number of partitions. For instance, a first communication protocol slot of the frame can be output and used for communication with one subset of the partitions at the premises, and a second communication protocol slot of the frame, different than the first communication protocol slot and allocated to a second different communication protocol than that of the first communication protocol slot, can be output and used for communication with another subset of the partitions at the premises. This communication extension mode can thus expand partition support within a network at the premises in a single frame (e.g., a single superframe). This can be useful, for instance, in allowing for deployment of the hub and devices at premises with a relatively large number of partitions, such as a high rise apartment building with a relatively large number of partitions each assigned for communication with the same hub (e.g., control panel).

One embodiment includes a method. This method includes the step of entering a communication extension mode. After entering the communication extension mode, this method includes outputting via a network, to at least a first device of a first partition and a second device of a second, different partition, a first beacon signal of a first communication extension mode frame. The first beacon signal can include a first indication of one slot of the first communication extension mode frame to be output after the first beacon signal and corresponding to a first communication protocol and a second indication of another slot of the first communication extension mode frame to be output after the first beacon signal and corresponding to a second communication protocol that is different than the first communication protocol. After outputting the first beacon signal, this method includes using the one slot of the first communication extension mode frame, corresponding to the first communication protocol, to transmit data via the network from the first device of the first partition using the first communication protocol. And, after outputting the first beacon signal, this method includes using the another slot of the first communication extension mode frame, corresponding to the second communication protocol, to transmit data via the network from the second device of the second partition using the second communication protocol.

In a further embodiment of this method, entering the communication extension mode comprises transitioning from a communication default mode to the communication extension mode. For example, in the communication default mode, data transmission from the first device of the first partition and from the second device of the second partition is confined to using only one of the first communication protocol and the second communication protocol. The second communication protocol can include BLUETOOTH, and in the communication default mode the another slot of the first communication extension mode frame is used to transmit data from the second device of the second partition using a first channel of the second communication protocol, and in the communication extension mode the another slot of the first communication extension mode frame is used to transmit data from the second device of the second partition using a second channel of the second communication protocol. For instance, the first channel of the second communication protocol is a BLUETOOTH advertising channel frequency, and wherein the second channel of the second communication protocol is a BLUETOOTH data channel frequency. In some instance, the method can further include the step of, when in the communication extension mode, increasing a bandwidth of the another slot of the first communication extension mode frame. In one such example, the bandwidth of the another slot of the first communication extension mode frame can be increased to be greater than a bandwidth of the another slot when in the communication default mode. In another such example, the communication extension mode is entered in response to determining that a number of partitions in the network exceeds a predetermined number of partitions in the network. In this example, the bandwidth of the another slot of the first communication extension mode frame is increased an extent corresponding to the number of partitions in the network.

In a further embodiment of this method, entering the communication extension mode comprises transitioning from a communication default mode to the communication extension mode in response to determining that a number of partitions in the network exceeds a predetermined number of partitions in the network. For example, a control panel can determine that the number of partitions in the network exceeds the predetermined number of partitions in the network. For instance, the control panel can include a record associating at least the first device with the first partition and at least the second device with the second, different partition. As one example, the predetermined number of partitions can be four.

In a further embodiment of this method, the first communication protocol can include IEEE 802.15.4 and the second communication protocol can include BLUETOOTH. And, the first communication extension mode frame is configured for a 2.4 GHz band. In one specific such example, the first device and the second device are selected from a group consisting of: a thermostat, a security device, a water heater, and a water flow controller.

Another embodiment includes an apparatus. This apparatus includes processing circuitry that is configured to: enter a communication extension mode, and, after entering the communication extension mode, output via a network, to at least a first device of a first partition and a second device of a second, different partition, a first beacon signal of a first communication extension mode frame. The first beacon signal can include a first indication of one slot of the first communication extension mode frame to be output after the first beacon signal and corresponding to a first communication protocol, and the first beacon signal can include a second indication of another slot of the first communication extension mode frame to be output after the first beacon signal and corresponding to a second communication protocol that is different than the first communication protocol. The processing circuitry can be further configured to: after outputting the first beacon signal, use the one slot of the first communication extension mode frame, corresponding to the first communication protocol, to transmit data via the network from the first device of the first partition using the first communication protocol, and, after outputting the first beacon signal, use the another slot of the first communication extension mode frame, corresponding to the second communication protocol, to transmit data via the network from the second device of the second partition using the second communication protocol.

In a further embodiment of this apparatus, the processing circuitry can be further configured to: communicate with the first device of the first partition and the second device of the second partition using time divisional multiple access (TDMA). The processing circuitry configured to enter the communication extension mode can include the processing circuitry configured to transition from a communication default mode to the communication extension mode. The second communication protocol can include BLUETOOTH, and, in the communication default mode, the processing circuitry can be configured to use the another slot of the first communication extension mode frame to transmit data from the second device of the second partition using a first channel of the second communication protocol. And, in the communication extension mode, the processing circuitry can be configured to use the another slot of the first communication extension mode frame to transmit data from the second device of the second partition using a second channel of the second communication protocol.

An additional embodiment includes a system. This system includes plurality of sensor devices including a first sensor device of a first partition of a network and a second sensor device of a second, different partition of the network and a control panel in communication with the plurality of sensor devices. The control panel includes processing circuitry configured to: enter a communication extension mode, and, after entering the communication extension mode, output via a network, to at least the first sensor device of the first partition and the second sensor device of the second, different partition, a first beacon signal of a first communication extension mode frame. The first beacon signal can include a first indication of one slot of the first communication extension mode frame to be output after the first beacon signal and corresponding to a first communication protocol, and the first beacon signal can include a second indication of another slot of the first communication extension mode frame to be output after the first beacon signal and corresponding to a second communication protocol that is different than the first communication protocol. This processing circuitry can be further configured to: after outputting the first beacon signal, use the one slot of the first communication extension mode frame, corresponding to the first communication protocol, to transmit data via the network from the first sensor device of the first partition using the first communication protocol, and after outputting the first beacon signal, use the another slot of the first communication extension mode frame, corresponding to the second communication protocol, to transmit data via the network from the second sensor device of the second partition using the second communication protocol.

In a further embodiment of this system, the processing circuitry can be further configured to communicate with the first sensor device of the first partition and the second sensor device of the second partition using time divisional multiple access (TDMA). The processing circuitry configured to enter the communication extension mode can include the processing circuitry configured to transition from a communication default mode to the communication extension mode. The second communication protocol can include BLUETOOTH. In the communication default mode, the processing circuitry can be configured to use the another slot of the first communication extension mode frame to transmit data from the second sensor device of the second partition using a first channel of the second communication protocol.

And, in the communication extension mode, the processing circuitry can be configured to use the another slot of the first communication extension mode frame to transmit data from the second sensor device of the second partition using a second channel of the second communication protocol.

The details of one or more examples of the disclosure are set forth in the accompanying drawings and the description below. Other features, objects, and advantages will be apparent from the description, drawings, and claims.

DETAILED DESCRIPTION

Figure 1A:
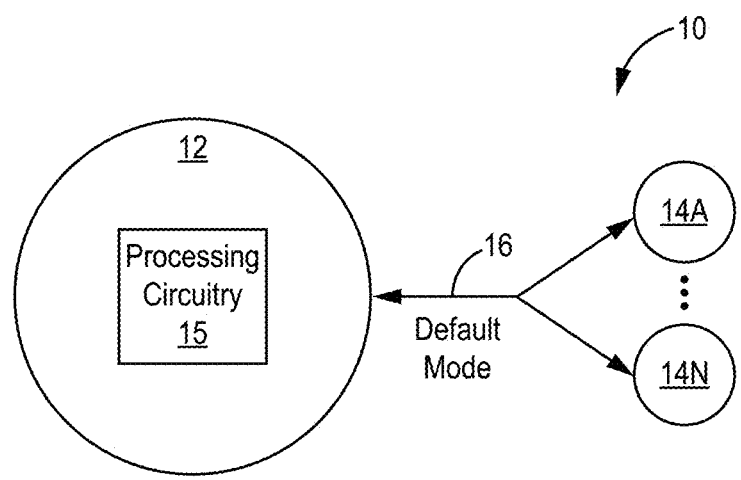
FIG. 1A is a conceptual diagram illustrating devices in communication using a communication default mode, in accordance with some examples of this disclosure.

Modern residential or commercial buildings or other types of premises can include a central "hub" device configured to manage one or more systems within the building, such as monitoring systems, comfort systems, or other security systems. The hub device may be in wireless communication with a number of other devices placed throughout the building. For example, the central hub device may wirelessly receive sensor data from any number of different sensor devices, such as motion sensors, air quality and/or temperature sensors, infrared sensors, door and/or window contact sensors, and/or other sensor devices. Additionally, the hub device may wirelessly transmit commands or instructions to one or more controllable sensor devices. For example, the hub device may instruct a thermostat to adjust a temperature within the building, or in another example, may command a damper to open or close an air vent.

In some applications for managing one or more systems within a building, BLUETOOTH radio communication techniques may have an advantage over other radio connection techniques such as, for example, IEEE 802.15.4 radio communication techniques. For instance, BLUETOOTH radio communications techniques may support high data rates and throughput compared to IEEE 802.15.4 radio communication techniques. For example, BLUETOOTH may have a bandwidth of greater than 500 kilobits-per-second (kbps) (e.g., 1 Mbps) and IEEE 802.15.4 may have a bandwidth of less than 500 kbps (e.g., 250 kbps). From a range perspective, BLUETOOTH radio techniques and IEEE 802.15.4 radio communication techniques may have nearly equal link budget. BLUETOOTH may have a range of greater than 80 meters (e.g., 100 meters) and IEEE 802.15.4 may have a range of less than 80 meters (e.g., 70 meters). In some examples, BLUETOOTH may have a join time (e.g., latency) of greater than 1 second (e.g., 3 seconds) and IEEE 802.15.4 may have a join time of less than 1 second (e.g., 30 milliseconds (ms)). BLUETOOTH may have a stack size of greater than 100 kb (e.g., 250 kb) and IEEE 802.15.4 may have a stack size of less than 100 kb (e.g., 28 ms). In some examples, IEEE 802.11, also referred to herein as simply "Wi-Fi™," may offer even higher data rates than BLUETOOTH but with a higher energy cost.

As used herein, BLUETOOTH may refer to present and future versions of BLUETOOTH. Examples of BLUETOOTH include classic BLUETOOTH (e.g., Versions 1.0, 1.0B, 1.1, 1.2, 2.0, 2.1, 3.0, 4.0, 4.1, 4.2, 5, 5.1, etc.), BLUETOOTH-low energy (e.g., Versions 4.0, 4.1, 4.2, 5, 5.1, etc.), and other types of BLUETOOTH. As such, all instances of "BLUETOOTH" herein should be interpreted as including classic BLUETOOTH and/or BLUETOOTH-low energy. BLUETOOTH may operate at frequencies between 2.402 and 2.480 GHz, 2.400 and 2.4835 GHz including a 2 MHz wide guard band and a 3.5 MHz wide guard band, or another frequency range. In some examples, each frequency channel of the BLUETOOTH channel may have a center frequency different from a central frequency of a neighboring channel by less than 1 MHz. In some examples, each frequency channel of a wireless channel (e.g., an IEEE 802.15.4 channel) may have a center frequency different from a central frequency of a neighboring channel by greater than 1 MHz (e.g., 2 MHz, 5 MHz, etc.).

BLUETOOTH may refer to communications that use frequency hopping, such as, for example, frequency-hopping spread spectrum, to avoid interference from other radio communications. For example, a device using a BLUETOOTH channel may operate a BLUETOOTH channel that hops between 37 frequency channels when using advertising channels and 40 frequency channels when operating without advertising channels. In contrast, IEEE 802.15.4 may instead use a direct sequence spread spectrum technique. For example, a device may establish a wireless channel using IEEE 802.15.4 by mixing a signal for the wireless channel with a pseudo-random code which is then extracted by a receiver from an external device. Direct sequence spread spectrum may help to enhance the signal-to-noise ratio by spreading the transmitted signal across a wide band. In some examples, a device establishing a wireless channel using IEEE 802.15.4 may be configured to scan for a clear spectrum.

Smart home, or home automation, devices may deploy many different wireless protocols to address the needs to the smart home. There are standards based protocols (Wi-Fi™, Zigbee™, Thread™, Zwave™, BLUETOOTH, DECT™, MATTER, etc.) and proprietary, manufacture specific protocols.

Smart home systems may include a collection of different networks that operate at a common frequency suitable for home networks. For example, a Wi-Fi™ network of a smart home system, a BLUETOOTH network of the smart home system, and an IEEE 802.15.4 network of the smart home system may each operate at a 2.4 GHz frequency. A hub device (e.g., a control panel) may allocate each device to a time slot, also referred to herein as simply "slot," of the superframe during a registration process. For example, the hub device may allocate a Wi-Fi™ slot to one or more first devices, a BLUETOOTH slot to one or more second devices, and an IEEE 802.15.4 slot to one or more third devices. In this example, the hub device may output the superframe using a beacon signal of the superframe that specifies a beginning of the superframe. All devices of the network may synchronize to the beacon signal and output data at the 2.4 GHz frequency according to the allocated slots of the superframe. For instance, the one or more first devices output data in accordance with the Wi-Fi™ protocol during the Wi-Fi™ slot, the one or more second devices output data in accordance with the BLUETOOTH protocol during the BLUETOOTH slot, and the one or more third devices output data in accordance with the IEEE 802.15.4 protocol during the 802.15.4 slot.

In accordance with the techniques of the disclosure, the hub device (e.g., control panel) can be configured to enter a communication extension mode (e.g., transition from a communication default mode to the communication extension mode). When in the communication extension mode, the hub device can be capable of wirelessly communicating with an increased number of partitions at the premises as compared to when the hub device is in the communication default mode. As one example, when the hub device is in the communication default mode the hub device can be capable of communicating with up to four partitions at the premises, but when the hub device is in the communication extension mode the hub device can be capable of communicating with more than four partitions at the premises (e.g., capable of communicating with up to sixteen partitions at the premises). As such, the ability of the hub device to transition to the communication extension mode can facilitate communication with an increased number of partitions at the premises by, for instance, utilizing the extent of the beacon slot payload of the frame output in the communication extension mode and then allocating an expanded number of partitions to a slot in the frame subsequent to the beacon slot to thereby provide additional payload capacity to the frame for accommodating such expanded number of partitions. This can be useful, for instance, in allowing for deployment of the hub device and devices at premises with a relatively large number of partitions, such as a high rise apartment building with a relatively large number of partitions each assigned for communication with the same hub (e.g., control panel)

FIG. 1A is a conceptual diagram illustrating devices in communication using a communication default mode, in accordance with some examples of this disclosure. In some examples, the communication default mode is a time divisional multiple access (TDMA) superframe mode capable of communication with up to a predetermined number of partitions (e.g., four partitions) in the premises network. While system 10 illustrates only hub device 12 (e.g., control panel) and sensor devices 14A-14N (collectively, "sensor devices 14" or simply "devices 14"), system 10 may include additional devices (e.g., devices in wireless communication with each other) or fewer devices. System 10 may be installed within a building and the surrounding premises (collectively, "premises").

Hub device 12 may include a computing device configured to operate one or more systems within a building, such as comfort, security, and/or safety systems. For example, as described further below, hub device 12 may include processing circuitry 15 configured to receive data, such as received from one or more devices and/or from user input, and process the data in order to automate one or more systems within a building. For example, hub device 12 may automate, control, or otherwise manage systems including heating and cooling, ventilation, illumination, or authorized access to individual rooms or other regions, as non-limiting examples. As one example, hub device 12 may include a control panel. As another example, hub device 12 may include a "Life and Property Safety Hub®" of Resideo Technologies, Inc.®, of Austin, Texas. Hub device 12 may include a wired connection to an electric power grid, but in some examples may include an internal power source, such as a battery, supercapacitor, or another internal power source.

Sensor devices 14 may be configured to enroll with hub device 12. For example, sensor device 14 may be configured to exchange sensor data with hub device 12 and/or be controlled by hub device 12. Sensor devices 14 may be configured to collect or generate sensor data, and transmit the sensor data to hub device 12 for processing. In some examples, sensor device 14 may include a controllable device. A controllable device may be configured to perform a specified function when the controllable device receives instructions (e.g., a command or other programming) to perform the function from hub device 12. Examples of different types of sensor devices 14 are included in the description of FIG. 2, below. Sensor devices 14 may include either a wired connection to an electric power grid or an internal power source, such as a battery, supercapacitor, or another internal power source.

Processing circuitry 15 may be configured to communicate with sensor devices 14 using one or more wireless communication protocols. Examples of wireless communication protocols may include, but not limited to, a low-power wireless connection protocol, a high-bandwidth connection protocol, or a local area networking protocol. Examples of a low-power connection protocol may include, but are not limited to, IEEE 802.15.4, a low power protocol using a 900 MHz frequency band, or another low-power connection protocol. As used herein, IEEE 802.15.4 may include any standard or specification compliant with IEEE 802.15.4, such, as for example, Zigbee™, ISA100.11a™, WirelessHART™, MiWi™ 6LoWPAN™, Thread™, SNAP™, and other standards or specifications that are compliant with IEEE 802.15.4. That is, for example, IEEE 802.15.4 should be interpreted herein as including implementations relying only on the IEEE 802.15.4 standard as well as implementations that build upon the IEEE 802.15.4 standard with additional specifications, such as, for example, Zigbee™. Examples of a high-bandwidth connection protocol may include, for example, BLUETOOTH (e.g., classic BLUETOOTH, BLUETOOTH low energy, etc.). Examples of a local area networking protocol may include, for example, Wi-Fi™ (e.g., IEEE 802.11 a/b/g/n/ac, etc.).

Although FIG. 1A shows hub device 12 as directly connected to sensor devices 14, in some examples, system 10 may include one or more repeater nodes that are each configured to act as an intermediary or "repeater" device. For example, sensor device 14A may output first data in accordance with Wi-Fi™ to a first repeater device, which outputs the first data to hub device 12. In this example, sensor device 14B may output second data in accordance with BLUETOOTH to a second repeater device, which outputs the second data to hub device 12. The first repeater device and the second repeater device may be the same device (e.g., a device configured to communicate in accordance with BLUETOOTH and in accordance with Wi-Fi™) or may be separate devices.

Processing circuitry 15 may be configured to use TDMA for communication in system 10 when in the communication default mode. For example, a Wi-Fi™ network of a smart home system, a BLUETOOTH network of the smart home system, and an IEEE 802.15.4 network of the smart home system may operate at a 2.4 GHz frequency (e.g., within a band of frequencies comprising 2.4 GHz). In this example, processing circuitry 15 may register each of devices 14 to a slot of a superframe. For example, processing circuitry 15 may allocate sensor device 14A to a first slot of a superframe 16, also referred to herein as simply "superframe 16," for a group of devices and allocate sensor device 14N to a second slot of superframe 16 for a group of devices. In the communication default mode, processing circuitry 15 may "output" superframe 16 by outputting a beacon signaling the beginning of the superframe. Each one of sensor devices 14 may synchronize with the beacon and output data according to the slots defined by the superframe. In some examples, processing circuitry 15 may periodically output superframe 16 to allow sensor devices 14 to output data.

Hub device 12 may allocate multiple devices to a single slot of a superframe, but possibly at different portions of the single slot. For example, hub device 12 may allocate sensor device 14A to a first 4 ms portion of an IEEE 802.15.4 slot and allocate sensor device 14N to a second 4 ms portion of the IEEE 802.15.4 slot that is different from the first 4 ms portion of the IEEE 802.15.4 slot. In some examples, hub device 12 may allocate sensor device 14A to a first channel (e.g., 2.402 GHz) of a BLUETOOTH slot and allocate sensor device 14N to a second channel (e.g., 2.479 GHz) of the BLUETOOTH slot that is different from the first channel.

In some systems, a hub device in the communication default mode can be limited in the number of partitions of devices it can communication with. For example, given the payload capacity of the beacon signal, the communication default mode may not be configured to support communication with more than a predetermined number of partitions (e.g., four) in the premises network. As such, the communication default mode may not be suitable for use at a premises network with a relatively large number of partitions (e.g., more than four partitions).

According to embodiments disclosed herein, hub device 12 can be configured to transition from the communication default mode to a communication extension mode that enables the hub device to communicate with an increased number of partitions at the premises network. For example, when hub device 12 enters the communication extension mode, the hub device can be configured to communicate with a greater number of partitions (e.g., more than four partitions) at the premises network than when in the communication default mode.

In accordance with the techniques of the disclosure, processing device 15 may output initial superframe 16 configured in communication default mode. For example, processing circuitry 15 may output the initial superframe 16 by outputting a first beacon signaling the beginning of the initial superframe 16. In response to the first beacon, sensor device 14A may output data according to the slots defined by initial superframe 16 and sensor device 14B may output data according to the slots defined by initial superframe 16. Initial superframe 16 may be in any superframe mode. For example, initial superframe 16 may be a comfort normal superframe mode that supports 64 devices with 4 ms alarm slots.

Figure 1B:
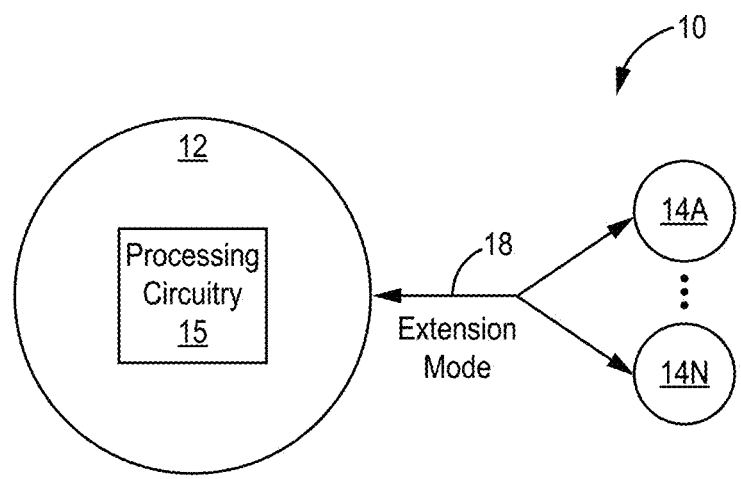
FIG. 1B is a conceptual diagram illustrating devices in communication using a communication extension mode, in accordance with some examples of this disclosure.

FIG. 1B is a conceptual diagram illustrating devices in communication using a communication extension mode, in accordance with some examples of this disclosure. Processing circuitry 15 may determine that a number of partitions at the premises network exceeds a predetermined number of partitions in the network (e.g., determine that a number of partitions at the premises network exceeds a number of partitions in the network for which the communication default mode is configured to communicate with).

Figure 2:
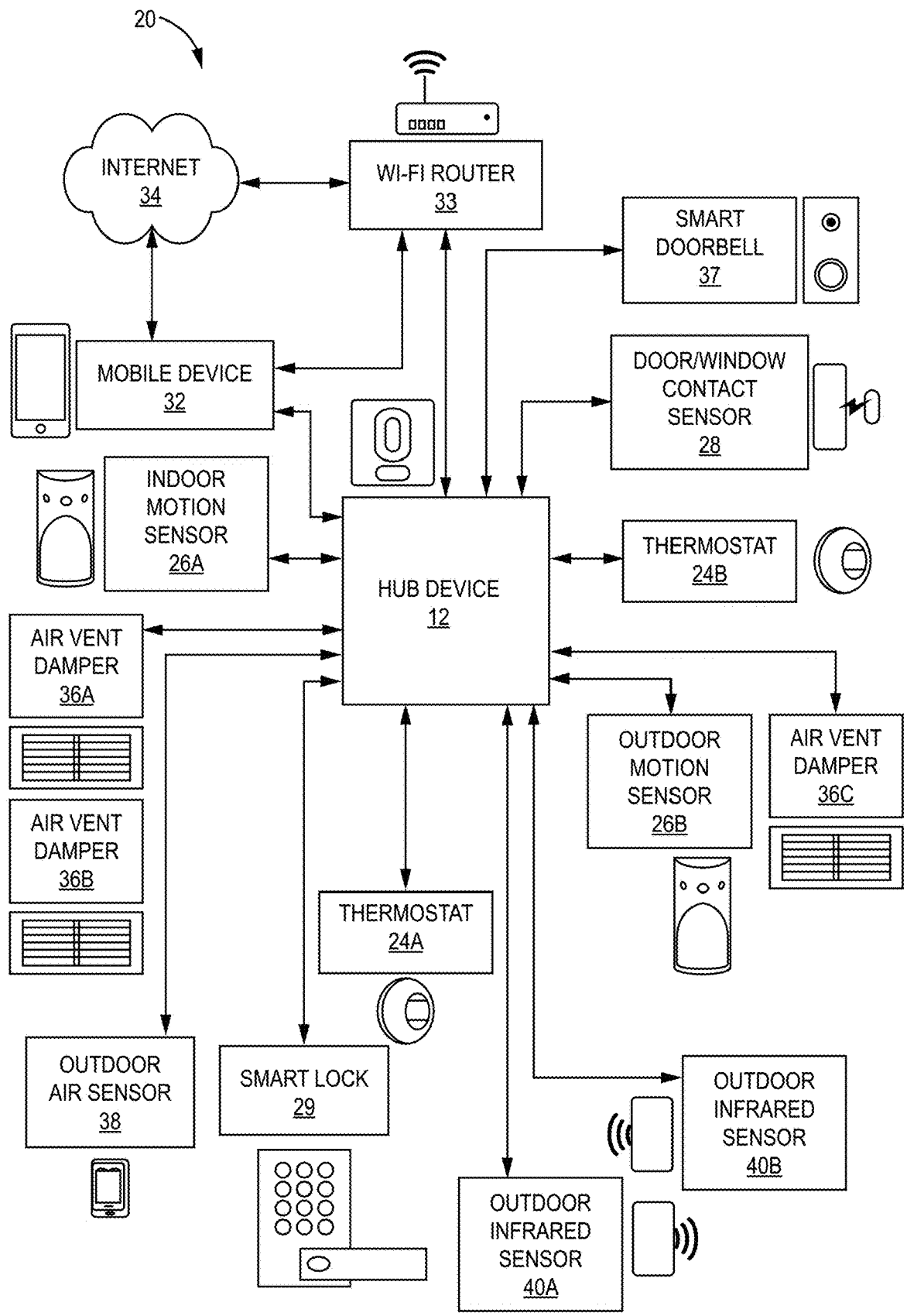
FIG. 2 is a conceptual block diagram illustrating an example of a premises network, in accordance with some examples of this disclosure.

FIG. 2 is a conceptual block diagram illustrating a premises network system 20, which may be one example of the premises network system 10 of FIG. 1, in accordance with some examples of this disclosure. System 20 includes hub device 12, thermostat 24A, thermostat 24B (collectively, thermostats 24), indoor motion sensor 26A, outdoor motion sensor 26B (collectively, motion sensors 26), door/window contact sensor 28, air vent damper 36A, 36B, 36C (collectively, air vent dampers 36), smart doorbell 37, outdoor air sensor 38, outdoor infrared sensor 40A, indoor infrared sensor 40B (collectively, infrared sensors 40), router 33, and mobile device 32. While hub device 12 is shown as a distinct component, hub device 12 may be integrated into one or more of thermostats 24, motion sensors 26, door/window contact sensor 28, air vent dampers 36, smart doorbell 37, outdoor air sensor 38, and infrared sensors 40. The various devices of system 20 are for example purposes only. For example, additional devices may be added to system 20 and/or one or more devices of system 20 may be omitted.

System 20 is a non-limiting example of the techniques of this disclosure. Other example systems may include more, fewer, or different components and/or devices. While FIG. 2 illustrates a mobile phone, mobile device 32 may, in some examples, include a tablet computer, a laptop or personal computer, a smart watch, a wireless network-enabled key fob, an e-readers, or another mobile device. Mobile device 32 and/or router 33 may be connected to a wide area network, such as, for example, internet 34. Internet 34 may represent a connection to the Internet via any suitable interface, such as, for example, a digital subscriber line (DSL), dial-up access, cable internet access, fiber-optic access, wireless broadband access, hybrid access networks, or other interfaces. Examples of wireless broadband access may include, for example, satellite access, WiMax™, cellular (e.g., 1×, 2G, 3G™, 4G™, 5G™, etc.), or another wireless broadband access.

Central hub device 12 may be in wireless data communication with thermostats 24, motion sensors 26, door/window contact sensor 28, air vent dampers 36, smart doorbell 37, outdoor air sensor 38, and infrared sensors 40. For example, thermostats 24, motion sensors 26, door/window contact sensor 28, air vent dampers 36, smart doorbell 37, outdoor air sensor 38, and infrared sensors 40 may be directly connected to hub device 12 using one or more wireless channels according to a connection protocol, such as, but not limited to, for example, IEEE 802.15.4, BLUETOOTH, or another connection protocol.

Each of thermostats 24, motion sensors 26, door/window contact sensor 28, air vent dampers 36, smart doorbell 37, outdoor air sensor 38, and infrared sensors 40 may include either a sensor device (e.g., a device configured to collect and/or generate sensor data), a controllable device, or both, as described herein. For example, thermostats 24 may include comfort devices having sensors, such as a thermometer configured to measure an air temperature. In some examples, air vent dampers 36 may include devices located within an air vent or air duct, configured to either open or close the shutters of an air vent in response to receiving instructions from hub device 12.

Although not shown in the example of FIG. 2, central hub device 12 may be in indirect wireless data communication (e.g., communication via a repeater node) with one or more of thermostats 24, motion sensors 26, door/window contact sensor 28, air vent dampers 36, smart doorbell 37, outdoor air sensor 38, and infrared sensors 40. For example, outdoor air sensor 38 may be indirectly connected thermostat to hub device 12 using a wireless channel according to a connection protocol, such as, but not limited to, for example, IEEE 802.15.4, BLUETOOTH, or another connection protocol. For instance, outdoor air sensor 38 may be connected to hub device 12 via thermostat 24A, outdoor infrared sensor 40A may be connected to hub device 12 via outdoor motion sensor 26B, etc.

Thermostats 24 may be configured to wirelessly transmit the temperature (e.g., sensor data) directly to hub device 12. Additionally, thermostats 24 may include controllable devices, in that they may activate or deactivate a heating, cooling, or ventilation system in response to receiving instructions from hub device 12. For example, thermostat 24A may collect temperature data and transmit the data to hub device 12. Hub device 12, in response to receiving the temperature data, may determine that a respective room is either too hot or too cold based on the temperature data, and transmit a command to thermostat 24A to activate a heating or cooling system as appropriate. In this example, each of thermostats 24 may include both sensor devices and controllable devices within a single distinct unit.

Indoor and outdoor motion sensors 26 may include security devices configured to detect the presence of a nearby mobile object based on detecting a signal, such as an electromagnetic signal, an acoustic signal, a magnetic signal, a vibration, or other signal. The detected signal may or may not be a reflection of a signal transmitted by the same device. In response to detecting the respective signal, motion sensors 26 may generate sensor data indicating the presence of an object, and wirelessly transmit the sensor data to hub device 12. Hub device 12 may be configured to perform an action in response to receiving the sensor data, such as outputting an alert, such as a notification to mobile device 32, or by outputting a command for the respective motion sensor 26 to output an audible or visual alert. In this example, each of motion sensors 26 may include both sensor devices and controllable devices within a single unit.

Door and/or window contact sensor 28 may include a security device configured to detect the opening of a door or window on which the door and/or window contact sensor 28 is installed. For example, contact sensor 28 may include a first component installed on a door or window, and a second component installed on a frame of the respective door or window. When the first component moves toward, past, or away from the second component, the contact sensor 28 may be configured to generate sensor data indicating the motion of the door or window, and wirelessly transmit the sensor data to hub device 12. In response to receiving the sensor data, hub device may be configured to perform an action such as outputting an alert, such as a notification to mobile device 32, or by outputting a command for the respective contact sensor 28 to output an audible or visual alert. In this example, contact sensor 28 may include a sensor devices and a controllable devices within a single unit.

Air vent dampers 36 may be configured to regulate a flow of air inside of a duct. For example, thermostats 24 may generate a control signal to close air vent damper 36A (e.g., when the room is not occupied). In this example, in response to the control signal, air vent damper 36 may close to prevent air from flowing from air vent damper 36A. In some examples, air vent dampers 36 may send sensor data indicating a state (e.g., open or closed) of the respective air vent damper. For instance, air vent damper 36 may output, to thermostats 24 an indication that air vent damper 36 is in an open state.

Smart doorbell 37 may be configured to provide notifications to hub device 12. For example, smart doorbell 37 may be configured to provide a notification (e.g., message) when a button (e.g., doorbell) of smart doorbell 37 is activated. In some examples, smart doorbell 37 may include motion sensor circuitry configured to generate a notification in response to motion detected near smart doorbell 37. In some examples, smart doorbell 37 may be configured to generate video content in response to motion detected near smart doorbell 37. In some examples, smart doorbell 37 may be configured to generate audio content in response to motion detected near smart doorbell 37. For instance, in response to motion detected near smart doorbell 37, smart doorbell 37 may generate video content using a camera and/or audio content using a microphone. In this instance, smart doorbell 37 may output the video content and audio content to hub device 12, which may forward the video content and/or audio content to mobile device 32.

Outdoor air sensor 38 may be configured to generate sensor data indicating, for example, a temperature, humidity, and/or quality (e.g., carbon monoxide, particulate matter, or other hazards) of the surrounding air. In some examples, outdoor air sensor 38 may wireless transmit the sensor data to hub device 12. For instance, outdoor air sensor 38 may periodically output a current or average temperature to thermostats 24 via hub device 12.

Outdoor passive infrared sensors 40 may include security devices configured to detect the presence of a nearby object, such as a person, based on detecting infrared wavelength electromagnetic waves emitted by the object. In response to detecting the infrared waves, passive infrared sensors 40 may generate sensor data indicating the presence of the object, and wirelessly transmit the sensor data to hub device 12. Hub device 12 may be configured to perform an action in response to receiving the sensor data, such as outputting an alert, such as a notification to mobile device 32, or by outputting a command for the respective passive infrared sensor 40 to output an audible or visual alert.

System 20 may include various devices, including, for example, a security device, a water heater, a water flow controller, a garage door controller, or other devices. For example, system 20 may include one or more of: a door contact sensor, a motion passive infrared (PIR) sensor, a mini contact sensor, a key fob, a smoke detector, a glass break detector, a siren, a combined smoke detector and Carbon monoxide (CO) detector, an indoor siren, a flood sensor, a shock sensor, an outdoor siren, a CO detector, a wearable medical pendant, a wearable panic device, an occupancy sensor, a keypad, and/or other devices.

In accordance with the techniques of the disclosure, hub device 12 and each of thermostats 24, motion sensors 26, door/window contact sensor 28, air vent dampers 36, smart doorbell 37, outdoor air sensor 38, and infrared sensors 40 may be configured to communicate using a frame, such as a superframe. While various examples described herein use IEEE 802.15.4 as an example of a first communication protocol and BLUETOOTH as an example of a second communication protocol, in some examples, other protocols may be used. Smart doorbell 37 is used as an example sensor device for example purposes only, and the other devices illustrated in FIG. 2 may operate in a similar, including identical, manner. In some examples, the first communication protocol and the second communication protocol are different from each other.

The devices in the premises network 20 can be grouped into a number of different partitions, and hub device 12 (e.g., control panel) can store a record thereat associating at least a first device (e.g., air vent damper 36A) with a first partition and a second, different device (e.g., air vent damper 36B) with a second, different partition. Likewise, the record stored at hub device 12 can associate other devices (e.g., air vent damper 36C) with other, different partitions. For instance, in the case of the premises network 20 deployed at a premises that is a high rise apartment complex, each floor or each unit of the high rise apartment complex can correspond to a different partition, or grouping, of sensor devices for use in communication with hub device 12.

Figure 3:
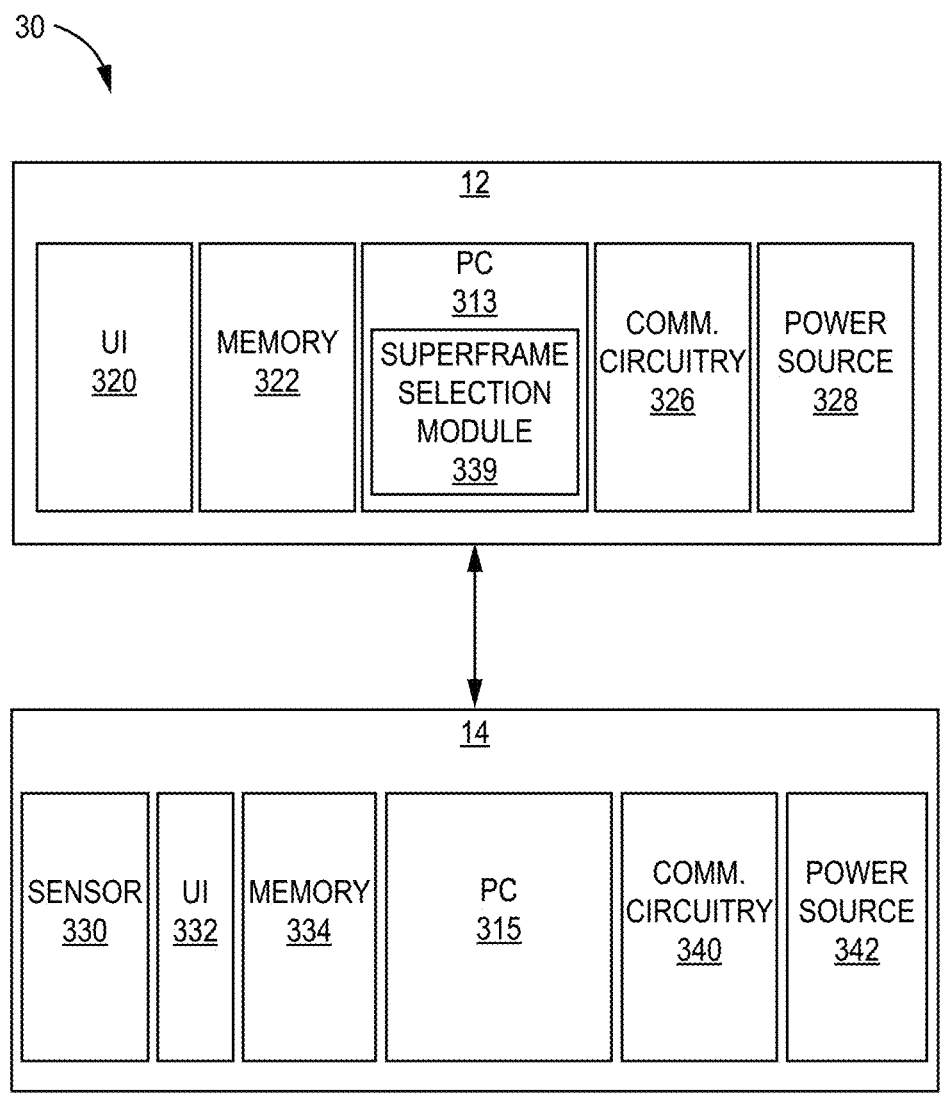
FIG. 3 is a conceptual block diagram of a hub device and a sensor device, in accordance with some examples of this disclosure.

FIG. 3 is a conceptual block diagram of a hub device 12 and a sensor device 14, in accordance with some examples of this disclosure. System 30 may be an example of any of the previous systems 10, 20, or another system. System 30 includes hub device 12 (e.g., control panel) and sensor device 14.

Hub device 12 may include at least a user interface (UI) 320, a memory 322, processing circuitry (PC) 313, communication circuitry 326 ("COMM. CIRCUITRY"), and a power source 328. UI 320 is configured to receive data input from, or output data to, a user. For example, UI 320 may include a display screen, such as a touchscreen, keyboard, buttons, microphone, speaker, camera, or any other user input/output device. Other examples of UI 320 are possible. For example, during an initial setup process, hub device 12 may "scan" a local proximity in order to identify one or more other devices (e.g., devices having recognizable wireless communication capabilities), and then output for display on a display screen a list of the discovered devices for selection by a user. Via UI 320, a user may also specify one or more parameters in order to control or otherwise manage a comfort and/or security system within a building and the surrounding premises. For example, via UI 320, a user may specify one or more air temperature settings or security settings, such as access codes and/or authorized users.

Hub device 12 includes a memory 322 configured to store data, as well as instructions that, when executed by processing circuitry 313, cause hub device 12 to perform one or more techniques in accordance with this disclosure. Communication circuitry 326 may include components, such as an antenna, configured to wirelessly transmit and receive data according to one or more wireless communication protocols. For example, communication circuitry 326 may be configured to transmit and/or receive data according to the IEEE 802.15.4 protocol, Wi-Fi™ and/or the BLUETOOTH protocol where appropriate, according to one or more constraints of the respective data communication protocols (e.g., communication range, energy requirements, etc.).

Power source 328 may include a wired connection to an electric power grid, due to the energy-intensive operations performed by hub device 12. However, in some examples, power source 328 may additionally or alternatively include an internal power source, such as a battery or supercapacitor. In the example of FIG. 3, hub device 12 omits a sensor, however, in some examples, hub device 12 may further include one or more sensors. Additionally, hub device 12 may be configured as a repeater node.

Sensor device 14 may be configured to wirelessly communicate with hub device 12. Sensor device 14 may include an incorporated sensor 330, a UI 332, a memory 334, processing circuitry (PC) 315, communication circuitry 340, and a power source 342. In some examples, sensor device 14 may include an incorporated sensor device, such as a motion sensor; passive infrared (PIR) sensor; air temperature and/or humidity sensor; air quality (e.g., carbon monoxide or particulate matter) sensor; or a door or window contact sensor, as non-limiting examples. Processing circuitry 313 may include wireless protocol selection module 339 that may be configured to select a first wireless protocol or a second wireless protocol for establishing a wireless connection. In some examples, wireless protocol selection module 339 may be configured to select between three or more wireless protocols for establishing a wireless connection.

UI 330 is configured to receive data input from, or output data to, a user. For example, UI 330 may include a display screen, such as a touchscreen, keyboard, buttons, microphone, speaker, camera, or any other user input/output device. Other examples of UI 330 are possible. For example, during an initial setup process, sensor device 14 may "scan" a local proximity in order to identify one or more hub devices and/or other devices (e.g., devices having recognizable wireless communication capabilities), and then output for display on a display screen a list of discovered devices for selection by a user. Via UI 330, a user may also specify one or more parameters in order to control or otherwise manage a comfort and/or security system within a building and the surrounding premises. For example, via UI 330, a user may specify one or more air temperature settings (e.g., for a thermostat) or security settings, such as access codes and/or authorized users. Sensor device 14 includes a memory 334 configured to store data, as well as instructions that, when executed by processing circuitry 315, cause sensor device 14 to perform one or more techniques in accordance with this disclosure.

Processing circuitry 315 and hub device 12 may exchange network parameters for pairing a BLUETOOTH channel. For example, processing circuitry 315 may determine (e.g., receive from hub device 12 or generate for output to hub device 12), one or more of: (1) a media access control (MAC) address of host device 22 and a MAC address of thermostat 24A; (2) a real time-point in time for the transfer to start (or offset from 802.15.4 start command); (3) an indication of a starting frequency; (4) an indication of a hop set; (5) a connection interval; or (6) a connection latency.

For example, processing circuitry 315 and hub device 12 may exchange a MAC address for device 12 and a MAC address for sensor device 14. In this example, communication circuitry 326 and communication circuitry 340 may be configured to establish a BLUETOOTH channel between the MAC address for hub device 12 and the MAC address for sensor device 14.

In some examples, processing circuitry 315 and hub device 12 may exchange an indication of a particular time to establish the BLUETOOTH channel. In this example, communication circuitry 326 and communication circuitry 340 may be configured to establish the BLUETOOTH channel between hub device 12 and sensor device 14 at the particular time.

For example, processing circuitry 315 and hub device 12 may exchange an indication of a starting frequency to establish the BLUETOOTH channel. In this example, communication circuitry 326 and communication circuitry 340 may be configured to establish a BLUETOOTH channel between hub device 12 and sensor device 14 at the starting frequency. For instance, the BLUETOOTH channel between hub device 12 and sensor device 14 may include 40 1 MHz wide channels that are separated by 2 MHz. In this example, the starting frequency may be an indication of a particular 1 MHz wide channel (e.g., channel 0, 1, . . . 39) and communication circuitry 326 and communication circuitry 340 may be configured to establish a BLUETOOTH channel between hub device 12 and sensor device 14 at the particular 1 MHz wide channel. The various frequencies of BLUETOOTH channels of BLUETOOTH channels, while slightly different from each other, may all correspond to a frequency for a superframe (e.g., 2.4 GHz).

Processing circuitry 315 and hub device 12 may exchange an indication of a hop set for the BLUETOOTH channel, the hop set indicating a sequence of frequencies. In this example, communication circuitry 326 and communication circuitry 340 may be configured to establish a BLUETOOTH channel between hub device 12 and sensor device 14 to operate at the sequence of frequencies. For instance, the BLUETOOTH channel between hub device 12 and sensor device 14 may include 40 1 MHz wide channels that are separated by 2 MHz. In this example, the sequence of frequencies may be an indication of an order for switching between the 1 MHz wide channels (e.g., channel 0, 1, ... 39) and communication circuitry 326 and communication circuitry 340 may be configured to establish a BLUETOOTH channel between hub device 12 and sensor device 14 that selects a 1 MHz wide channel according to the order for switching between the 1 MHz wide channels.

In some examples, processing circuitry 315 and hub device 12 may exchange an indication of a connection interval for the BLUETOOTH channel. In this example, communication circuitry 326 and communication circuitry 340 may be configured to establish a BLUETOOTH channel between hub device 12 and sensor device 14 to operate at the connection interval. For instance, rather than exchanging data at any time on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at the connection interval.

Processing circuitry 315 and hub device 12 may exchange an indication of a connection latency for the BLUETOOTH channel. In this example, communication circuitry 326 and communication circuitry 340 may be configured to establish a BLUETOOTH channel between hub device 12 and sensor device 14 to operate at the connection latency. For instance, rather than exchanging data at any time or at a connection interval on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at a latency interval of sensor device 14 or hub device 12. This latency interval may be selected to reduce a time a radio of sensor device 14 and/or hub device 12 listens for data (further from a connection interval), which may reduce a power consumption of sensor device 14 and/or hub device 12 compared to systems that omit a latency interval or use a zero latency interval.

Processing circuitry 315 and hub device 12 may exchange an indication of antenna information for a plurality of antennas at sensor device 14. In this example, communication circuitry 326 and communication circuitry 340 may be configured to select a particular antenna from the plurality of antennas based on the antenna information and to establish a BLUETOOTH channel between hub device 12 and sensor device 14 using the particular antenna.

Hub device 12 and sensor device 14 may be configured to communicate using a superframe. For example, sensor device 14 may output an enrollment signal to hub device 12. Hub device 12 may assign sensor device 14 a partition, or group, number and output an indication of the group number to sensor device 14. Hub device 12 may then control a timing of communications using the superframe. For example, hub device 12 may specify a start of a superframe using a beacon and identify devices that may communicate by specifying a partition, or group, assigned to the superframe. In this way, sensor device 14 may determine when to output data. For example, sensor device 14 may, in response to a beacon output by hub device 12 indicating the group number assigned to sensor device 14, output data in accordance with the superframe.

Superframe selection module 339 may select a communication mode, such as one of a communication default mode and a communication extension mode. In some examples, superframe selection module 339 may select a superframe mode based on configuration data received by hub device 12 or information included at the stored record associating the various devices in the premises network with particular partitions. For example, superframe selection module 339 may determine that a number of partitions in the premises network exceeds a predetermined number of partitions (e.g., exceeds a number of partitions that the communication default mode is configured to communication with, such as exceeding four partitions), and in response transition to the communication extension mode to facilitate communication with those partitions in excess of the partitions with which the communication default mode is capable of communicating with.

Figure 4:
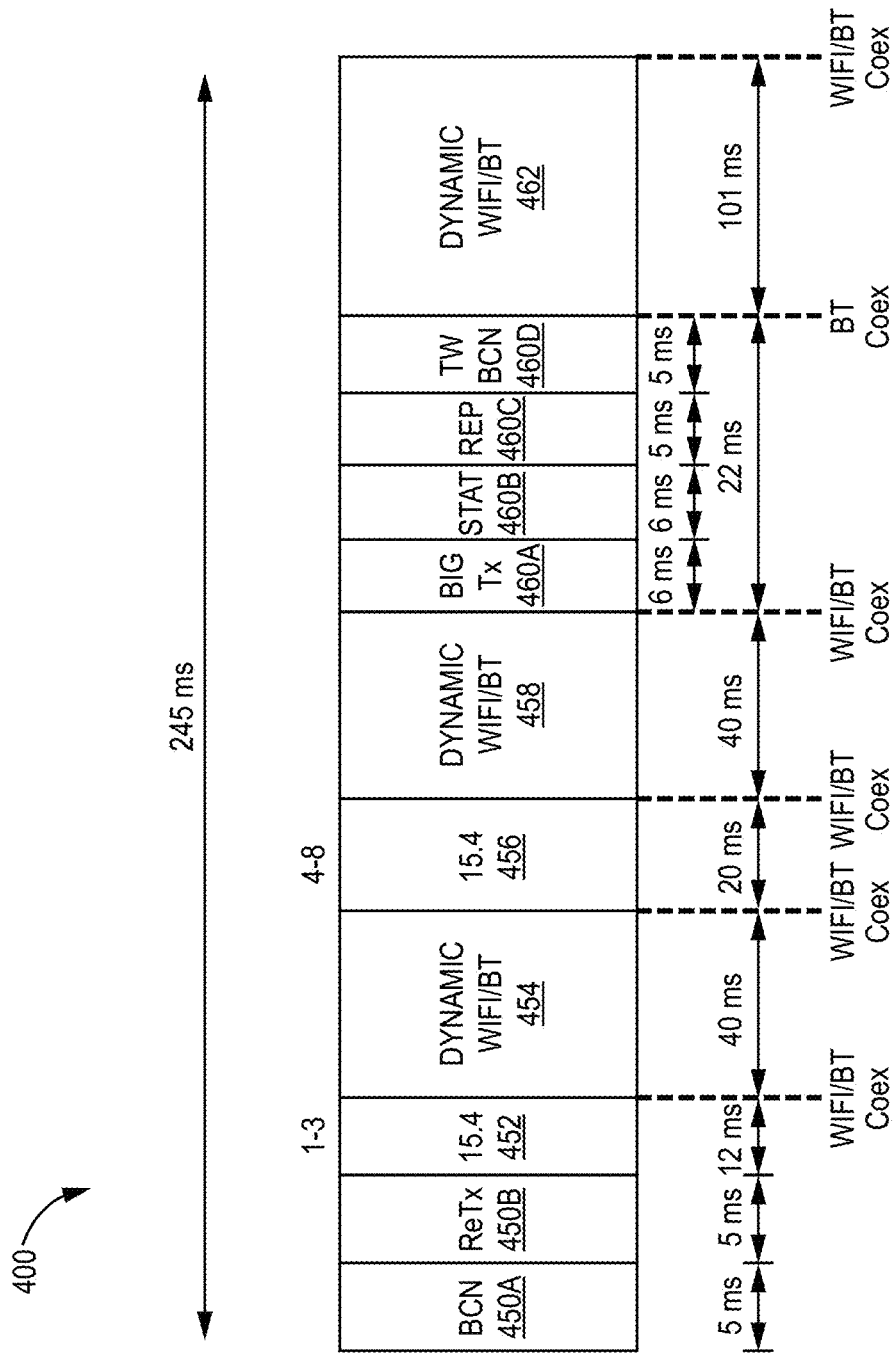
FIG. 4 is a conceptual block diagram of an example of a frame output in the communication default mode, in accordance with some examples of this disclosure.

FIG. 4 is a conceptual block diagram of an example of slots of a superframe that is in the communication default mode, in accordance with some examples of this disclosure. As shown, superframe 400 may include a beacon slot 450A ("BCN 450A") and a retransmission slot 450B ("ReTx"), which may be collectively referred to here as beacon slot 450A. The order of slots shown in FIG. 4 is for example purposes only. Timing shown in FIG. 4 is for example purposes only. For example, superframe 400 may be shorter than 245 ms or longer than 245 ms. Superframe 400 is for example purposes only. For example, a superframe may include different slots (e.g., one or more slots may be removed and/or one or more slots may be added) and/or may include slots of different widths (e.g., different durations) than superframe 400.

Beacon slot 450A may mark the beginning of superframe 400. Beacon slot 450A may be used by all the end devices (e.g., sensor devices 14) across various partitions to synchronize to the coordinator (e.g., hub device 12). As such, all devices in the system may synchronize to a master clock of the coordinator (e.g., hub device 12) thus forming a time synchronized networking system. Beacon slot 450A may include information that is used by the end devices to understand the system status, respond to commands, or other information. The duration of beacon slot 450A may be 5 ms. The order of beacon slot 450A and a retransmission slot 450B shown in FIG. 4 is for example purposes only. Beacon slot 450A may include additional or fewer slots. In some examples, the timing of beacon slot 450A may be less than 5 ms or more than 5 ms.

Retransmission slot 450B may be used for a new (e.g., non-enrolled) devices to associate with a coordinator (e.g., hub device 12) and thus become part of a personal area network (PAN), such as system 10, system 20, system 30 or another system. Once the enrollment mode is disabled, end devices of the previous superframe group may use retransmission 450B to attempt retransmission. The duration of retransmission slot 450B may be 5 ms.

15.4 slots 452 and 456 may be used for communications compliant with IEEE 802.15.4. In an example, there may be up to two or four 15.4 slots in a superframe, however, other examples may use other combinations. Each slot may include sub-slots comprising a duration of, for example, 2 ms, 4 ms, 5, ms, etc. End devices (e.g., sensor devices 14) may use 15.4 slots 452 and 456 to transmit an alarm message, a status message, a Redlink™ network protocol (RNP) message, a supervision message, or other information. The total duration of each of 15.4 slot 452 and 15.4 slot 456 time segment may be, for example, 32 ms or 64 ms. The media access protocol for 15.4 slots 452 and 456 used may be TDMA. If a sensor device is not enrolled in a 15.4 slot, hub device 12 may allocated the 15.4 slots to Wi-Fi™ or BLUETOOTH.

Dynamic Wi-Fi™ BLUETOOTH slot 454 ("DYNAMIC Wi-FI™/BT 454") and dynamic Wi-Fi™ BLUETOOTH slot 458 ("DYNAMIC Wi-FI™/BT 458") may be referred to herein as a Wi-Fi™ coexistence time segments. A Wi-Fi™ time segment may be used by a Wi-Fi™ module populated on a thermostat device to transmit different types of network packets. Dynamic Wi-Fi™ BLUETOOTH slot 454, 458 may include alarm messages from the thermostat device to the central monitoring station, video streaming packets from one Wi-Fi™ client (e.g., camera or video capable sensor video/image) to another (e.g., GUI based touch screen/Cloud, etc.). The Wi-Fi™ might be operating in different modes: (a) Wi-Fi™ Client, (b) Wi-Fi™-AP, (c) Wi-Fi™-Hybrid. Wi-Fi™ slots may be dynamic, these slots may be shared to BLUETOOTH or Wi-Fi™ depending on different modes of superframes. As shown, dynamic Wi-Fi™ BLUETOOTH slot 454 and dynamic Wi-Fi™ BLUETOOTH slot 458 may be 40 ms.

Big TX/RX Slot 460A ("Big Tx 460A"), status slot 460B, repeater slot 460C ("REP 460C"), and twin beacon slot 460D ("TW BCN 460D") may be collectively referred to herein as beacon slot B 460. The order of Big TX/RX Slot 460A, status slot 460B, repeater slot 460C, and twin beacon slot 460D shown in FIG. 4 is for example purposes only. Beacon slot B 460 may include additional or fewer slots.

Big TX/RX Slot 460A may include one or more large data transmit slots that are each more than 10 bytes and may be up to 96 bytes. An access point (e.g., hub device 12) may be able to send any data to any device using this slot. Data can be unicast, broadcast or groupcast depending on a type of request. This mode of communication may be indicated in beacon A slot 450. Big TX/RX Slot 460A may be used to send over-network download (OND) blocks to sensor devices or to set configure sensor devices. If the TX/RX Slot 460A is not active, hub device 12 may allocate time for TX/RX Slot 460A to Wi-Fi™ to increase time for Wi-Fi™ communication.

Status slot 450B may share a status with some or all of sensor devices 14. Status slot 450B may not be active at every instance of a superframe. Status slot 450B may include data that is unicast, broadcast, or groupcast depending on a type of request. This mode of communication may be indicated in beacon A slot 450.

Repeater slot 460C may be configured for sending and receiving data from repeaters of a large/small data. An access point (e.g., hub device 12) may be able to send any data to any repeater using repeater slot 460C. Data included in repeater slot 460C can be unicast, broadcast or groupcast depending on a type of request. This mode of communication may be indicated in beacon A slot 450.

Twin beacon slot 460D may be called information beacon/twin beacon. Payload of twin beacon 460D may be almost same as beacon slot 450A with some exceptions but may operate in a different channel referred to herein as an information channel. Twin beacon slot 460D may be present in all superframes irrespective of modes of operation. Twin beacon slot 460D may be used by all the end devices to synchronize to the coordinator only if they lose connection with an access point using beacon slot 450A. Twin beacon slot 460D may not be used for synchronization of time but may be used to share the information like what is the operation channel or frequency hopping sequence or a next channel of communication. The duration of twin beacon slot 460D may be 5 ms. In some examples, the timing of twin beacon slot 460D may be less than 5 ms or more than 5 ms.

Dynamic BLUETOOTH slot 462 may be dedicated to BLUETOOTH by an access Point (e.g., hub device 12). Dynamic BLUETOOTH slot 462 may support mobile and sensor communication. Allocation of dynamic BLUETOOTH slot 462 may vary with different modes of comfort/security superframes as described further below. As shown, dynamic BLUETOOTH slot 462 may be 101 ms. In some examples, the timing of dynamic BLUETOOTH slot 462 may be less than 101 ms or more than 101 ms.

Figure 5:
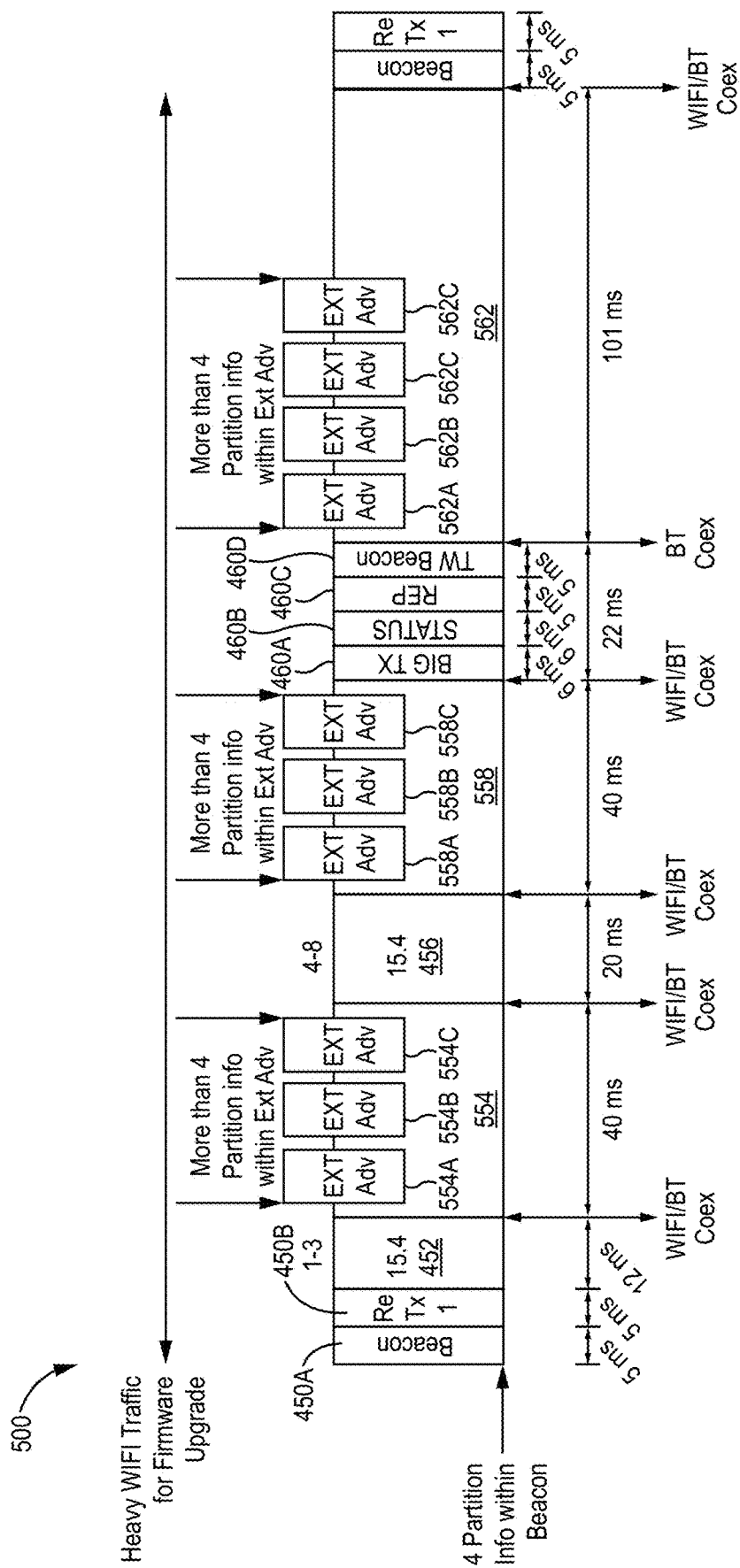
FIG. 5 is a conceptual block diagram of an example frame output in the communication extension mode, in accordance with some examples of this disclosure.

FIG. 5 is a conceptual block diagram of an example of slots of a superframe 500 that is in the communication extension mode, in accordance with some examples of this disclosure.

The superframe 500 can be similar to the superframe 400 described with respect to FIG. 4 except as otherwise noted here. For example, unlike the superframe 400 which is output according to the communication default mode and confined to communication with a predetermined number of partitions (e.g., four) in the premises network, the superframe 500 is output according to the communication extension mode and thereby configured for communication with more than the predetermined number of partitions in the premises network. In the illustrated embodiment, the predetermined number of partitions in the premises network is four, though other embodiments within the scope of this disclosure can use the teachings provided herein to enter the communication extension mode where the predetermined number of partitions is a number more or less than four.

The superframe 500, output in the communication extension mode, can include (e.g., start) with the beacon slot 450A. For the illustrated embodiment, the beacon slot 450A can be similar to, or the same as, the beacon slot 450A described with respect to the superframe 400 configured in the communication default mode. Likewise, the superframe 500 can include the 15.4 slot 452 that can be similar to, or the same as, the 15.4 slot 452 described with respect to the superframe 400 configured in the communication default mode. The beacon signal 450A of the superframe 500 (e.g., "communication extension mode frame") can include a first indication of one slot (e.g., 15.4 slot 452), of the superframe 500, that is to be output after the beacon signal 450A and corresponding to a first communication protocol (e.g., IEEE 802.15.4). And, the beacon signal 450A can include a second indication of another slot (e.g., 554A), of the superframe 500, that is to be output after the beacon signal 450A and corresponding to a second communication protocol (e.g., BLUETOOTH) that is different than the first communication protocol.

As illustrated, the superframe 500, configured in the communication extension mode, can differ from the superframe 400, configured in the communication default mode, in that the superframe 500 includes additional beacon-type information outside of the beacon slot 450A. Namely, for the illustrated embodiment, the superframe 500 includes beacon-type information in one or more of the BLUETOOTH communication protocol slots 554, 558, 562.

As one such example, each of the BLUETOOTH communication protocol slots 554, 558, 562 can include one or more BLUETOOTH advertising channels (e.g., advertising channel 37 at BLUETOOTH low energy (BLE) frequency channel 2402 MHZ; advertising channel 38 at BLUETOOTH low energy (BLE) frequency channel 2426 MHZ; and advertising channel 39 at BLUETOOTH low energy (BLE) frequency channel 2480 MHZ) and one or more BLUETOOTH data channels (e.g., data channels 0-10 respectively at BLUETOOTH low energy (BLE) frequency channels 2404-2424; and data channels 11-36 respectively at BLUETOOTH low energy (BLE) frequency channels 2428-2478). The superframe 500 can include dedicated device data reception slots at one or more of the BLUETOOTH data channels (e.g., each of the BLUETOOTH data channels), and the superframe 500 can include beacon-type information at one or more of the BLUETOOTH advertising channels at one or more of the BLUETOOTH communication protocol slots 554, 558, 562. For example, the superframe 500 can include beacon-type information at slot 554A at BLUETOOTH advertising channel 37 at BLUETOOTH low energy (BLE) frequency channel 2402 MHZ of BLUETOOTH communication protocol slot 554; beacon-type information at slot 554B at BLUETOOTH advertising channel 38 at BLUETOOTH low energy (BLE) frequency channel 2426 MHZ of BLUETOOTH communication protocol slot 554; and/or beacon-type information at slot 554C at BLUETOOTH advertising channel 39 at BLUETOOTH low energy (BLE) frequency channel 2480 MHZ of BLUETOOTH communication protocol slot 554. Similarly, depending on the number of partitions defined for the premises network, the superframe 500 can include beacon-type information at additional BLUETOOTH communication protocol slots 558, 562. For example, superframe 500 can additionally include beacon-type information at slot 558A at BLUETOOTH advertising channel 37 at BLUETOOTH low energy (BLE) frequency channel 2402 MHZ of BLUETOOTH communication protocol slot 558; beacon-type information at slot 558B at BLUETOOTH advertising channel 38 at BLUETOOTH low energy (BLE) frequency channel 2426 MHZ of BLUETOOTH communication protocol slot 558; and/or beacon-type information at slot 558C at BLUETOOTH advertising channel 39 at BLUETOOTH low energy (BLE) frequency channel 2480 MHZ of BLUETOOTH communication protocol slot 558. Additionally or alternatively, for example, superframe 500 can include beacon-type information at slot 562A at BLUETOOTH advertising channel 37 at BLUETOOTH low energy (BLE) frequency channel 2402 MHZ of BLUETOOTH communication protocol slot 562; beacon-type information at slot 562B at BLUETOOTH advertising channel 38 at BLUETOOTH low energy (BLE) frequency channel 2426 MHZ of BLUETOOTH communication protocol slot 562; and/or beacon-type information at slot 562C at BLUETOOTH advertising channel 39 at BLUETOOTH low energy (BLE) frequency channel 2480 MHZ of BLUETOOTH communication protocol slot 562. In one example, for instance where the number of partitions defined for the premises network is quite large, in addition to use of the BLUETOOTH advertising channel(s), superframe 500 can include beacon-type information at a BLUETOOTH data channel (e.g., beacon-type information at slot 562D at a BLUETOOTH data channel at a BLUETOOTH low energy (BLE) data channel frequency of BLUETOOTH communication protocol slot 562).

Thus, the superframe 500 can include beacon-type information at both the beacon slot 450A and one or more of the BLUETOOTH communication protocol slots 554, 558, 562. For example, both the beacon slot 450A and one or more of the BLUETOOTH communication protocol slots 554, 558, 562 can include one or more indications of a specified slot of the superframe 500 to be output after the beacon signal 450A in the superframe 500 and corresponding to a particular type of communication protocol (e.g., BLUETOOTH). In this way, the superframe 500, configured in the communication extension mode, can be configured to support a relatively large number of partitions that are defined for a particular application at a premises network. Accordingly, the superframe 500, configured in the communication extension mode, can enable communication amongst a hub device and sensor devices grouped according to a relatively large number of different partitions, for instance as may be the case at a relatively large premises network (e.g., a high rise apartment building).

As one illustrative example according to the embodiment of the superframe 500 illustrated at FIG. 5, beacon slot 450A can include a first plurality of first indications of one slot of the superframe 500 to be output after the beacon signal, which corresponds to beacon slot 450A, where the one slot of the superframe 500 corresponds to a first communication protocol. For instance, in the illustrate embodiment of superframe 500, beacon slot 450A can include a first plurality of four first indications of 15.4 slot 452 of superframe 500 to be output after the beacon signal 450A and corresponding to a first communication protocol of IEEE 802.15.4. And, BLUETOOTH slot 554 can include a second plurality of second indications of another slot of the superframe 500 to be output after the beacon signal, which corresponds to beacon slot 450A, where the one slot of the superframe 500 corresponds to a second, different communication protocol. Then, when the 15.4 slot 452 begins, sensor devices of first, second, third, and fourth partitions can transmit data to the hub device at the indicated sub-slot of the 15.4 slot 452. And, after that, when the BLUETOOTH slot 554 begins, sensor devices of fifth, sixth, and seventh partitions can transmit data to the hub device according to beacon-type indications provided at one or more of sub-slots 554A, 554B, and 554C. For instance, the beacon-type indication(s) can be provide at the BLUETOOTH advertising channel(s), such as disclosed previously herein, and the BLUETOOTH data channel(s) can be used to accommodate sensor device data transmission from the fifth, sixth, and seventh partitions according to the beacon-type indication(s) provided at the BLUETOOTH advertising channel(s).

The time duration illustrated for each slot of the superframe 500 is exemplary and non-limiting. For example, another embodiment of a superframe output in the communication extension mode could include a different slot time duration for any one or more of the BLUETOOTH slots 554, 558, 562 (e.g., greater than that illustrated at FIG. 5 for any one or more of the BLUETOOTH slots, for instance 50 ms for the BLUETOOTH slot 554) and a different slot time duration for any one or more of the non-BLUETOOTH slots (e.g., lesser than that illustrated at FIG. 5 for any one or more of the non-BLUETOOTH slots, for instance 10 ms for the 15.4 slot 456). As such, the processing circuitry (e.g., at the hub device) can be configured to adjust the slot time duration for any one or more of the BLUETOOTH slots 554, 558, 562 to thereby correspondingly adjust the bandwidth available at one or more of the BLUETOOTH slots 554, 558, 562.

The superframe 500 output in the communication extension mode can be output from an embodiment of an apparatus. As one such example, an apparatus, such as a hub device (e.g., control panel) disclosed elsewhere herein, can include processing circuitry (e.g., processing circuitry 15;

processing circuitry 313 including superframe selection module 339). This processing circuitry can be configured to enter the communication extension mode. After entering the communication extension mode, this processing circuitry can be configured to output via the premises network, to at least a first device of a first partition and a second device of a second, different partition, the first beacon signal 450A of the first communication extension mode frame 500. The first beacon signal 450A can include a first indication of one slot 452 of the first communication extension mode frame 500 to be output after the first beacon signal 450A and corresponding to a first communication protocol (e.g., IEEE 802.15.4), and the first beacon signal 450A can include a second indication of another slot 554A of the first communication extension mode frame 500 to be output after the first beacon signal 450A and corresponding to a second communication protocol (e.g., BLUETOOTH) that is different than the first communication protocol. After outputting the first beacon signal 450A, this processing circuitry can be configured to use the one slot 452 of the first communication extension mode frame 500, corresponding to the first communication protocol, to transmit data via the premises network from the first device of the first partition using the first communication protocol. And, after outputting the first beacon signal 450A, this processing circuitry can be configured to use the another slot 554A of the first communication extension mode frame 500, corresponding to the second communication protocol, to transmit data via the premises network from the second device of the second partition using the second communication protocol.

This apparatus embodiment can include the noted processing circuitry further configured to communicate with the first device of the first partition and the second device of the second partition using time divisional multiple access (TDMA). Moreover, this processing circuitry configured to enter the communication extension mode can include this processing circuitry configured to transition from the communication default mode to the communication extension mode. Then, when in the communication default mode, this processing circuitry can be configured to use the another slot of the first communication extension mode frame to transmit data from the second device of the second partition using a first channel of the second communication protocol. And, when in the communication extension mode, this processing circuitry can be configured to use the another slot of the first communication extension mode frame to transmit data from the second device of the second partition using a second channel of the second communication protocol.

Figure 6:
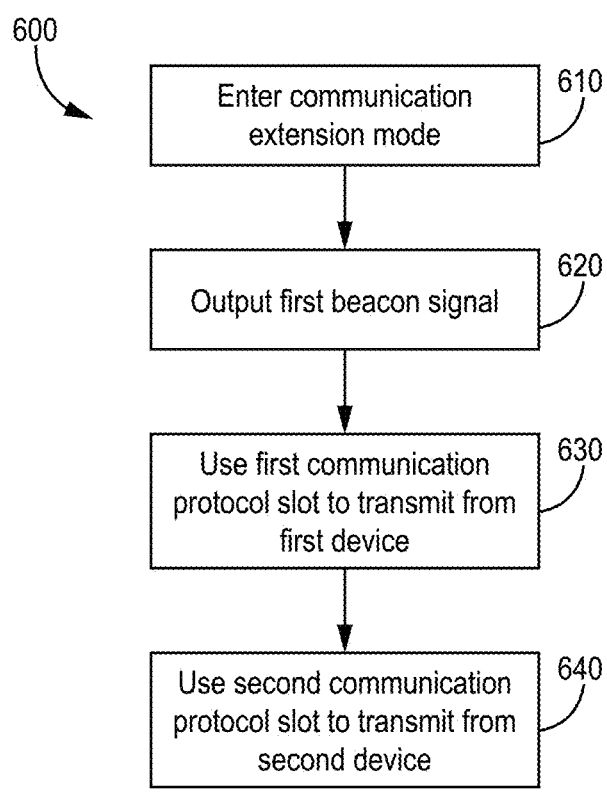
FIG. 6 is a flow diagram illustrating of an example technique for communication in the communication extension mode, in accordance with some examples of this disclosure.

FIG. 6 is a flow diagram of a method 600 for communication in the communication extension mode, in accordance with some examples of this disclosure. The method 600 can be executed using any one or more of the features disclosed elsewhere herein. The method 600 can be executed, for instance, via processing circuitry included at the hub device (e.g., control panel) of the premises network.

At step 610, the method 600 includes entering a communication extension mode. As one example, entering the communication extension mode can include transitioning from the communication default mode to the communication extension mode. For instance, in the communication default mode data transmission from a first device (e.g., first sensor device) of a first partition of the premises network and from a second device (e.g., second sensor device) of a second, different partition can be confined to using only one of the first communication protocol and the second communication protocol. The second communication protocol can includes BLUETOOTH. In the communication default mode, the another slot of the first communication extension mode frame can be used to transmit data from the second device of the second partition using a first channel of the second communication protocol. And, when transitioned to the communication extension mode, the another slot of the first communication extension mode frame can be used to transmit data from the second device of the second partition using a second channel of the second communication protocol. For instance, the first channel of the second communication protocol can be a BLUETOOTH advertising channel frequency, and the second channel of the second communication protocol can be a BLUETOOTH data channel frequency.

For example, entering the communication extension mode at step 610 can include transitioning from a communication default mode to the communication extension mode in response to determining that a number of partitions in the network exceeds a predetermined number of partitions in the network. In instances where the method 600 is executed at a hub device in the form of a control panel, the control panel can determine that the number of partitions in the network exceeds the predetermined number of partitions in the network. For instance, the control panel can include a record associating at least the first device with the first partition and at least the second device with the second, different partition, and the control panel can use this record to compare the number of partitions in the premises network to the predetermined number of partitions. As one specific such example, the predetermined number of partitions can be four, and, when the control panel determines that devices, with which the control panel is to communicate with in the premises network, are grouped into more than four partitions, the control panel can change to the communication extension mode.

At step 620, the method 600 includes, after entering the communication extension mode, outputting via a premises network, to at least a first device of a first partition and a second device of a second, different partition, a first beacon signal of a first communication extension mode frame. The first beacon signal can include a first indication of one slot of the first communication extension mode frame to be output after the first beacon signal and corresponding to a first communication protocol. And the first beacon signal can also include a second indication of another slot of the first communication extension mode frame to be output after the first beacon signal and corresponding to a second communication protocol that is different than the first communication protocol. For example, the first communication protocol can include IEEE 802.15.4 and the second communication protocol can include BLUETOOTH. In such an example, the first communication extension mode frame can be configured for a 2.4 GHz band. And, in such an example, the first device and the second device can be selected from a group consisting of: a thermostat, a security device, a water heater, and a water flow controller.

At step 630, the method 600 includes, after outputting the first beacon signal, using the one slot of the first communication extension mode frame, corresponding to the first communication protocol, to transmit data via the network from the first device of the first partition using the first communication protocol.

At step 640, the method 600 incudes, after outputting the first beacon signal, using the another slot of the first communication extension mode frame, corresponding to the second communication protocol, to transmit data via the network from the second device of the second partition using the second communication protocol.

In a further embodiment of the method 600, the method 600 can include a step of, when in the communication extension mode, increasing a bandwidth of the another slot of the first communication extension mode frame. The communication extension mode can be entered and the bandwidth of the another slot of the first communication extension mode frame can be increased, for instance, in response to determining that a number of partitions in the premises network exceeds a predetermined number of partitions (e.g., four) in the premises network. For example, the bandwidth of the another slot of the first communication extension mode frame can be increased to be greater than a bandwidth of the another slot when in the communication default mode. As a more specific such example, where the communication extension mode is entered and the bandwidth of the another slot of the first communication extension mode frame is increased in response to determining (e.g., at the hub device) that a number of partitions in the premises network exceeds a predetermined number of partitions (e.g., four) in the premises network, the bandwidth of the another slot of the first communication extension mode frame is increased an extent corresponding to the number of partitions in the network. Where the another slot of the first communication extension mode frame corresponds to a BLUETOOTH communication protocol, for instance, increasing the bandwidth of the another slot of the first communication extension mode frame to an extent corresponding to the number of partitions in the network can include allocating additional time to the another slot of the first communication extension mode frame where such additional time is allocated to an extent corresponding to the number of partitions in the network beyond the predetermined number of partitions.

The disclosure may be implemented using computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A method comprising the steps of:
    entering a communication extension mode;
    after entering the communication extension mode, outputting via a network, to at least a first device of a first partition and a second device of a second, different partition, a first beacon signal of a first communication extension mode frame, wherein the first beacon signal includes a first indication of one slot of the first communication extension mode frame to be output after the first beacon signal and corresponding to a first communication protocol, and wherein the first beacon signal includes a second indication of another slot of the first communication extension mode frame to be output after the first beacon signal and corresponding to a second communication protocol that is different than the first communication protocol;

after outputting the first beacon signal, using the one slot of the first communication extension mode frame, corresponding to the first communication protocol, to transmit data via the network from the first device of the first partition using the first communication protocol; and after outputting the first beacon signal, using the another slot of the first communication extension mode frame, corresponding to the second communication protocol, to transmit data via the network from the second device of the second partition using the second communication protocol.

2. The method of claim 1, wherein entering the communication extension mode comprises transitioning from a communication default mode to the communication extension mode.

3. The method of claim 2, wherein in the communication default mode data transmission from the first device of the first partition and from the second device of the second partition is confined to using only one of the first communication protocol and the second communication protocol.

4. The method of claim 2, wherein the second communication protocol includes BLUETOOTH, wherein in the communication default mode the another slot of the first communication extension mode frame is used to transmit data from the second device of the second partition using a first channel of the second communication protocol, and wherein in the communication extension mode the another slot of the first communication extension mode frame is used to transmit data from the second device of the second partition using a second channel of the second communication protocol.

5. The method of claim 4, wherein the first channel of the second communication protocol is a BLUETOOTH advertising channel frequency, and wherein the second channel of the second communication protocol is a BLUETOOTH data channel frequency.

6. The method of claim 2, further comprising the step of:
when in the communication extension mode, increasing a bandwidth of the another slot of the first communication extension mode frame.

7. The method of claim 6, wherein the bandwidth of the another slot of the first communication extension mode frame is increased to be greater than a bandwidth of the another slot when in the communication default mode.

8. The method of claim 6, wherein the communication extension mode is entered in response to determining that a number of partitions in the network exceeds a predetermined number of partitions in the network.

9. The method of claim 8, wherein the bandwidth of the another slot of the first communication extension mode frame is increased an extent corresponding to the number of partitions in the network.

10. The method of claim 1, wherein entering the communication extension mode comprises transitioning from a communication default mode to the communication extension mode in response to determining that a number of partitions in the network exceeds a predetermined number of partitions in the network.

11. The method of claim 10, wherein a control panel determines that the number of partitions in the network exceeds the predetermined number of partitions in the network.

12. The method of claim 11, wherein the control panel includes a record associating at least the first device with the first partition and at least the second device with the second, different partition.

13. The method of claim 11, wherein the predetermined number of partitions is four.

14. The method of claim 1, wherein the first communication protocol includes IEEE 802.15.4, and wherein the second communication protocol includes BLUETOOTH.

15. The method of claim 14, wherein the first communication extension mode frame is configured for a 2.4 GHz band.

16. The method of claim 15, wherein the first device and the second device are selected from a group consisting of: a thermostat, a security device, a water heater, and a water flow controller.

17. An apparatus comprising processing circuitry configured to:
enter a communication extension mode;
after entering the communication extension mode, output via a network, to at least a first device of a first partition and a second device of a second, different partition, a first beacon signal of a first communication extension mode frame, wherein the first beacon signal includes a first indication of one slot of the first communication extension mode frame to be output after the first beacon signal and corresponding to a first communication protocol, and wherein the first beacon signal includes a second indication of another slot of the first communication extension mode frame to be output after the first beacon signal and corresponding to a second communication protocol that is different than the first communication protocol;
after outputting the first beacon signal, use the one slot of the first communication extension mode frame, corresponding to the first communication protocol, to transmit data via the network from the first device of the first partition using the first communication protocol; and
after outputting the first beacon signal, use the another slot of the first communication extension mode frame, corresponding to the second communication protocol, to transmit data via the network from the second device of the second partition using the second communication protocol.

18. The apparatus of claim 17, wherein the apparatus is configured to communicate with the first device of the first partition and the second device of the second partition using time divisional multiple access (TDMA), wherein the processing circuitry configured to enter the communication extension mode comprises the processing circuitry configured to transition from a communication default mode to the communication extension mode, wherein the second communication protocol includes BLUETOOTH, wherein, in the communication default mode, the processing circuitry is configured to use the another slot of the first communication extension mode frame to transmit data from the second device of the second partition using a first channel of the second communication protocol, and wherein, in the communication extension mode, the processing circuitry is configured to use the another slot of the first communication extension mode frame to transmit data from the second device of the second partition using a second channel of the second communication protocol.

19. A system comprising:
a plurality of sensor devices including a first sensor device of a first partition of a network and a second sensor device of a second, different partition of the network;
a control panel in communication with the plurality of sensor devices, the control panel comprising processing circuitry configured to:
enter a communication extension mode;

after entering the communication extension mode, output via a network, to at least the first sensor device of the first partition and the second sensor device of the second, different partition, a first beacon signal of a first communication extension mode frame, wherein the first beacon signal includes a first indication of one slot of the first communication extension mode frame to be output after the first beacon signal and corresponding to a first communication protocol, and wherein the first beacon signal includes a second indication of another slot of the first communication extension mode frame to be output after the first beacon signal and corresponding to a second communication protocol that is different than the first communication protocol;

after outputting the first beacon signal, use the one slot of the first communication extension mode frame, corresponding to the first communication protocol, to transmit data via the network from the first sensor device of the first partition using the first communication protocol; and after outputting the first beacon signal, use the another slot of the first communication extension mode frame, corresponding to the second communication protocol, to transmit data via the network from the second sensor device of the second partition using the second communication protocol.

20. The system of claim 19, wherein the control panel is configured to communicate with the first sensor device of the first partition and the second sensor device of the second partition using time divisional multiple access (TDMA), wherein the processing circuitry configured to enter the communication extension mode comprises the processing circuitry configured to transition from a communication default mode to the communication extension mode, wherein the second communication protocol includes BLUETOOTH, wherein, in the communication default mode, the processing circuitry is configured to use the another slot of the first communication extension mode frame to transmit data from the second sensor device of the second partition using a first channel of the second communication protocol, and wherein, in the communication extension mode, the processing circuitry is configured to use the another slot of the first communication extension mode frame to transmit data from the second sensor device of the second partition using a second channel of the second communication protocol.

* * * * *